US006457962B1

(12) United States Patent
Elmore

(10) Patent No.: US 6,457,962 B1
(45) Date of Patent: Oct. 1, 2002

(54) WATER CANDLE BOX

(76) Inventor: David A. Elmore, 10202 34th Ave. East, Tacoma, Pierce County, WA (US) 98335

(*) Notice: Subject to any disclaimer, the term of this patent is extended or adjusted under 35 U.S.C. 154(b) by 13 days.

(21) Appl. No.: 09/680,001

(22) Filed: Oct. 5, 2000

Related U.S. Application Data

(62) Division of application No. 09/474,923, filed on Dec. 29, 1999, now Pat. No. 6,251,481.

(51) Int. Cl.[7] .......................... B29C 41/20; B29C 41/02

(52) U.S. Cl. ....................... 425/110; 425/375; 425/447; 425/803

(58) Field of Search ................................ 425/375, 803, 425/110, 447, 472, 69, 67

(56) References Cited

U.S. PATENT DOCUMENTS

| | | | | | |
|---|---|---|---|---|---|
| 3,046,178 | A | * | 7/1962 | Tupper | |
| 3,287,484 | A | * | 11/1966 | Justus | |
| 3,724,982 | A | * | 4/1973 | Davis | 425/803 |
| 3,752,433 | A | * | 8/1973 | Berman | 425/803 |
| 3,867,173 | A | * | 2/1975 | Putzer | |
| 3,894,136 | A | * | 7/1975 | Waddill | 264/245 |
| 3,974,996 | A | * | 8/1976 | Violet | 425/803 |
| 4,022,862 | A | * | 5/1977 | McBride et al. | 264/313 |
| 4,153,007 | A | * | 5/1979 | Menig | 118/101 |
| 4,602,886 | A | * | 7/1986 | Smit | |
| 5,078,945 | A | * | 1/1992 | Byron | 425/803 |
| 5,340,433 | A | * | 8/1994 | Crump | 425/378.1 |
| 5,362,427 | A | * | 11/1994 | Mitchell, Jr. | 425/447 |
| 5,632,615 | A | * | 5/1997 | DeGarmo | 264/277 |
| 5,988,446 | A | * | 11/1999 | Schitter | 425/122 |

FOREIGN PATENT DOCUMENTS

| | | | | | |
|---|---|---|---|---|---|
| FR | 2583334 | A | * | 12/1986 | 425/375 |
| JP | 64-74299 | A | * | 3/1989 | 425/803 |

* cited by examiner

*Primary Examiner*—Robert Davis
(74) *Attorney, Agent, or Firm*—James F. Leggett

(57) ABSTRACT

A device for making decorative candles which have varied shapes and colors of wax throughout in an heated water bath and an apparatus utilizing said device comprised of multiple heated sources of melted wax suspended above an open topped waterproof box, having one side lined with a water proof gasket through which a waterproof sleeve communicates to a base plate upon which the candle is formed by moving the plate in three dimensions within the water bath and collecting thereon the colored wax, supplied to the top of the water by a heated tube means from selected sources of melted colored wax, as it sinks and cools in the water. The rate of cooling of the wax is controlled by the temperature of the water bath. The water borne wax is built up around a core candle or around a wick, stretched from the center of the plate to an arm, extending to the center of the plate from a rod extending from one edge of the plate to a selected height above the plate.

11 Claims, 5 Drawing Sheets

FIG. 8
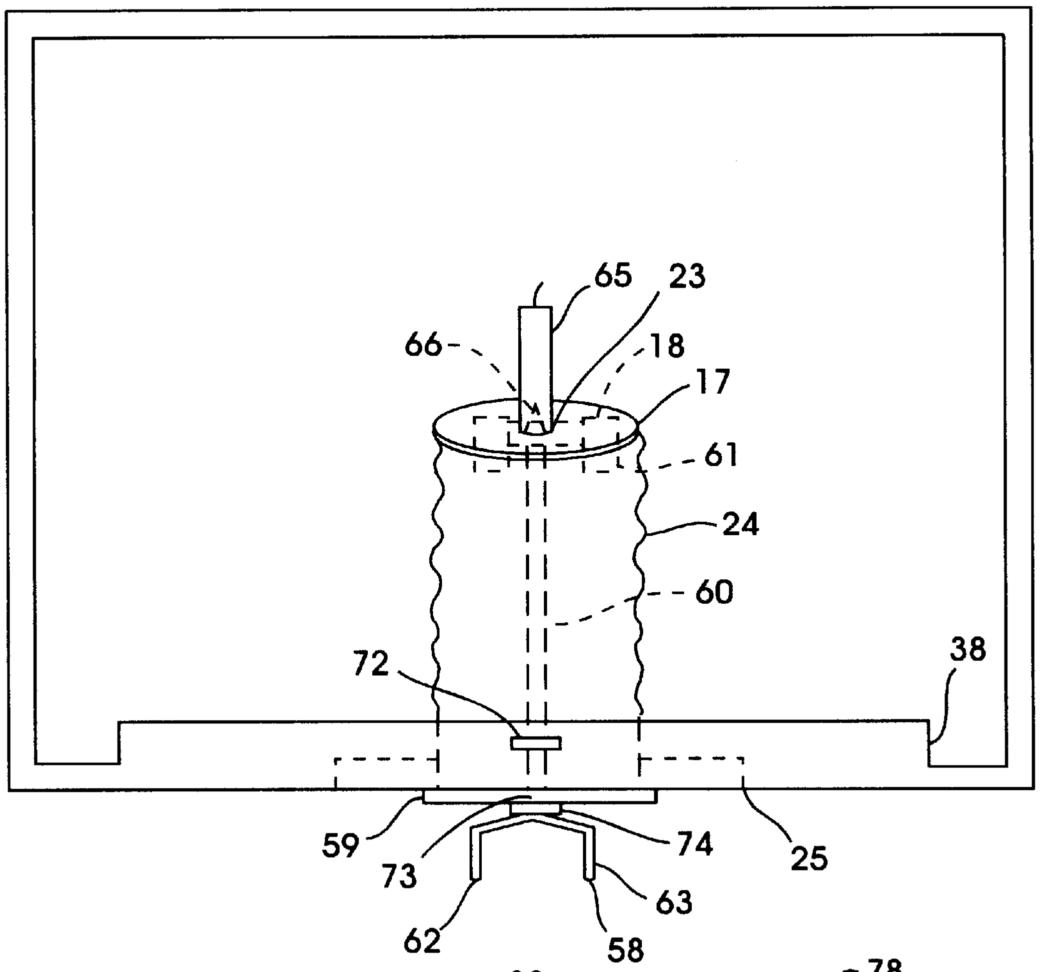
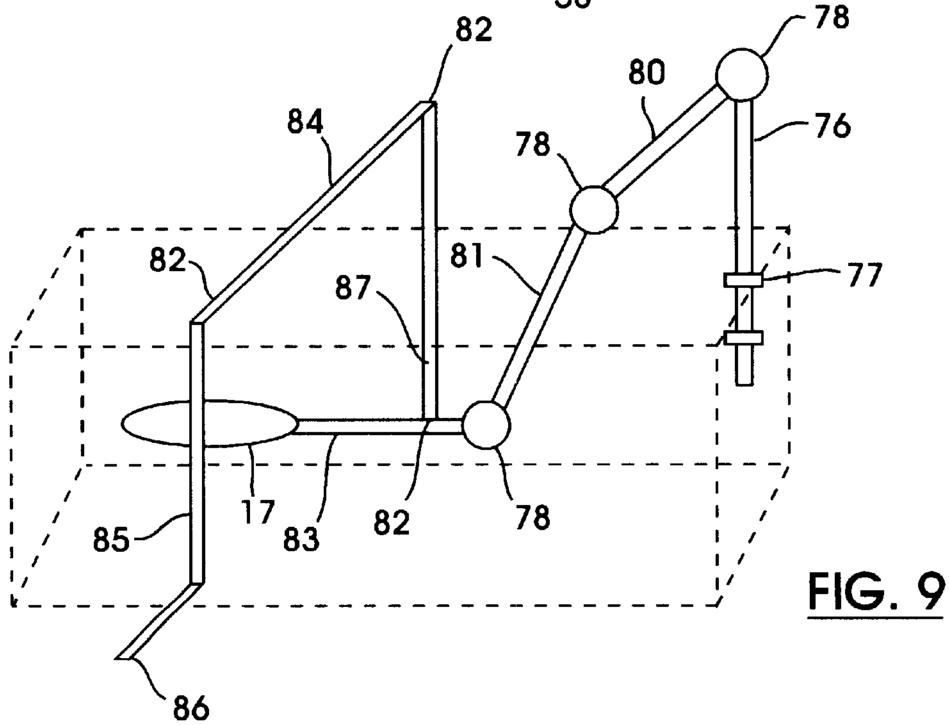
FIG. 9

WATER CANDLE BOX

This is a Divisional Application of U.S. application Ser. No. 09/474,923 filed 12/29/99 and now U.S. Pat. No. 6,251,481.

BACKGROUND OF THE INVENTION

This invention relates generally to an and apparatus for making candles which have multi-colored wax throughout the thickness of the candle and the wax is applied thereto in a decorative manner. Candle making has traditionally utilized molds of varied shape and complexity, such as those of Davis' U.S. Pat. No. 3,724,982, Berman's U.S. Pat. No. 3,752,433. In order to vary the color patterns of the candle, prior art has been limited to surface treatment, such as in Putzer's U.S. Pat. No. 3,867,173, and the exterior of the candle could only be decoratively constructed by means of an elaborate mold, such as Violet's U.S. Pat. No. 3,974,996. These devices and methods limit the artistic expression of the maker.

SUMMARY OF THE INVENTION

Accordingly, it is an object of the present invention to provide the artist, candle maker, with an apparatus to employ a method to create candles of various external shapes and multiple colors, wherein the color extends through the radius of the candle, which candle can be formed in a single step without a mold.

The preferred embodiment of the apparatus, Water Candle Box, is comprised of one or more heated wax reservoirs, suspended above a water bath, to which the heated wax is selectively supplied by heated wax supply tubes. The water bath is maintained at a temperature to control the time of setting of the wax to enable the selected decorative design to form. Within the water bath is a base plate, upon which the heated wax collects, affixed to the top of a base plate holder capable of being moved in three dimensions within the water bath either by direct or remote manipulation through a waterproof sleeve extending from the outside of a water proof box containing the water bath via a waterproof gasket. The heated wax may be formed around a small core candle or merely around a wick, stretched from the center of the base plate to the end of an arm directly above, supported by a vertical shaft originating from the side of the base plate. As the process is completed under water, the risk of air pockets in the wax build-up is eliminated.

The novel features of the invention will be best understood from the following description in light of the accompanying drawings. While particular embodiments of the present invention are shown and described, it will be obvious to those skilled in the art that changes and modifications may be made without departing from this invention in its broader aspects and, therefore, the aim of the appended claims is to cover all such changes and modifications as fall within the true spirit and scope of this invention.

BRIEF DESCRIPTION OF THE DRAWINGS

FIG. 8 is an overhead perspective view of a remote control alternate;

FIG. 9 is a perspective view of an alternate means to control the base plate.

DESCRIPTION OF THE PREFERRED EMBODIMENTS

Figure 1:
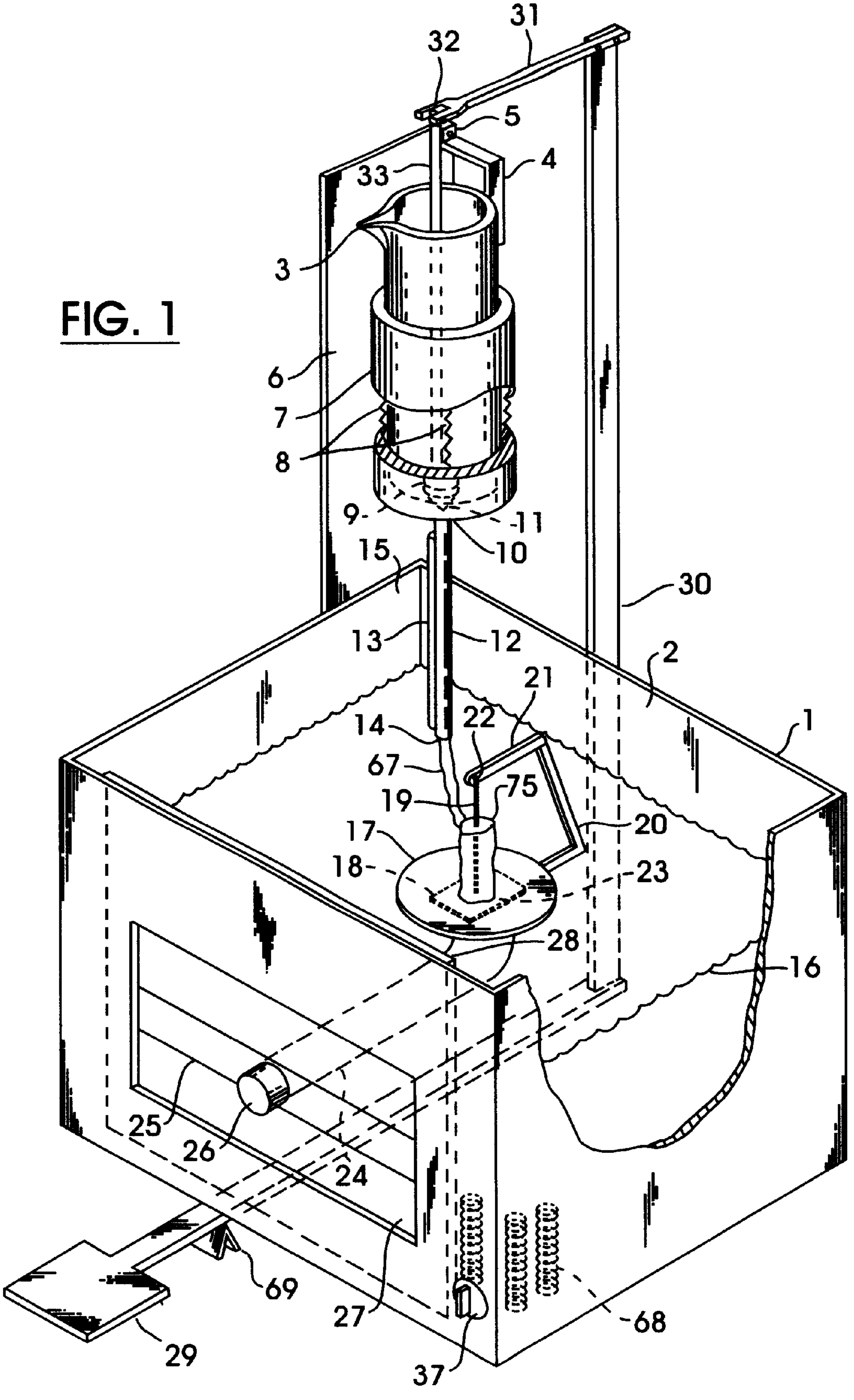
FIG. 1 is a perspective view of one embodiment of the present invention with a single wax reservoir.
Figure 6:
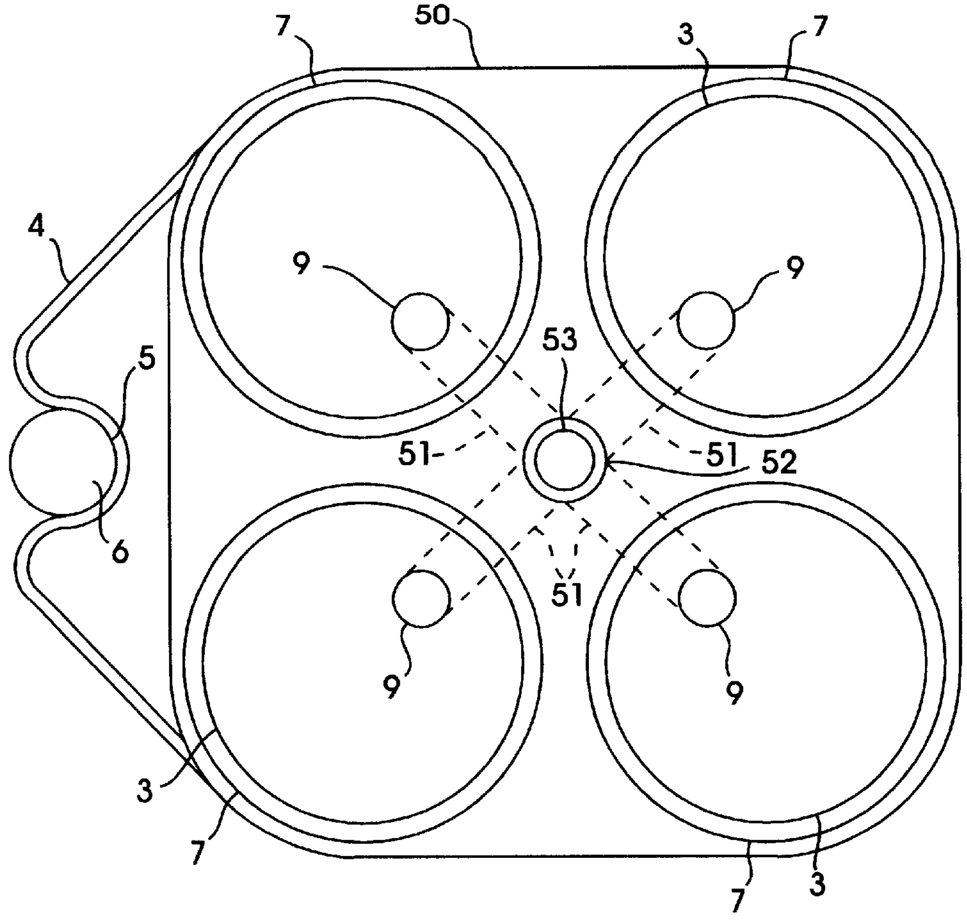
FIG. 6 is an overhead view of a multiple wax reservoir basket.
Figure 7:
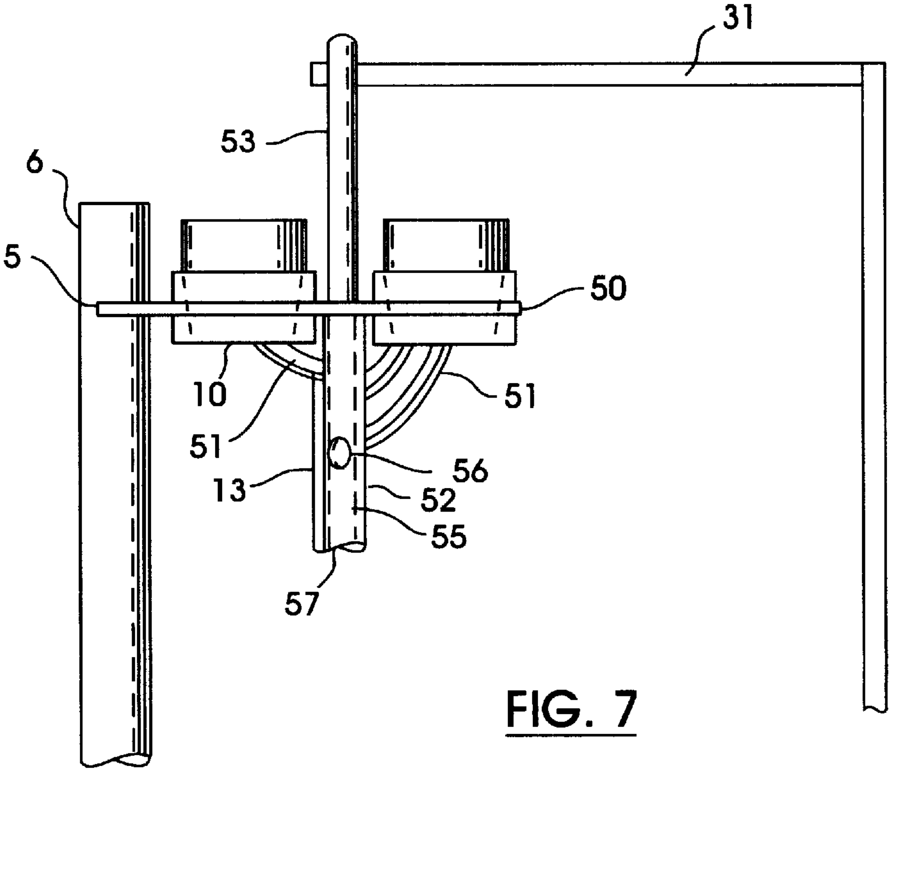
FIG. 7 is a perspective view of a multiple wax reservoir basket.

Considering now the method of the invention in some detail with reference to FIG. 1, candle wax in liquid form (67) is conveyed from a wax reservoir (3), having a bottom and sides, contained in a heated cradle (7), having a bottom and sides, through a guide tube (12), which has a guide tube heat element (13) and released above the surface of water (16) contained in a waterproof box (1) with an open top (2). The liquid wax (67) descends through the water (16) via gravity and collects on a base plate (17) around either a core candle (65) or a wick (19) to form a decorative candle (75). The base plate (17) is manually manipulated in the horizontal, vertical and rotational planes by means of a flexible waterproof sleeve (24) extending through an access hole (26) in one side of the waterproof box (1), so that the candle maker (artist) can vary the form, texture and size of the candle. This method also includes the use of multiple wax reservoirs (3) as shown in FIGS. 6 and 7, so that different colors of liquid wax may be incorporated in the decorative candle (75).

Figure 2:
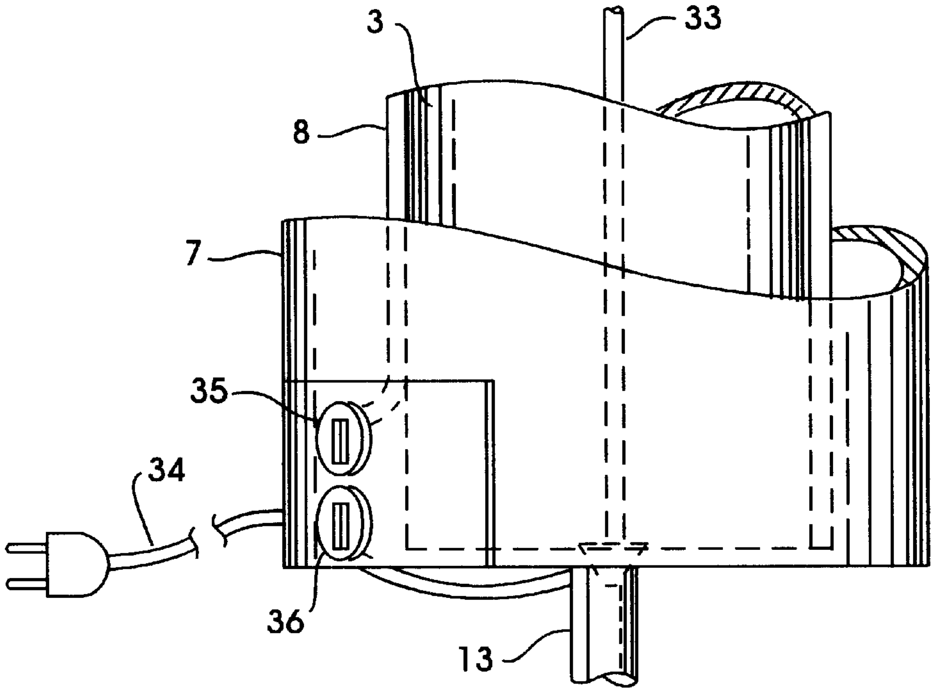
FIG. 2 is an expanded view of a wax reservoir and heated cradle.
Figure 3:
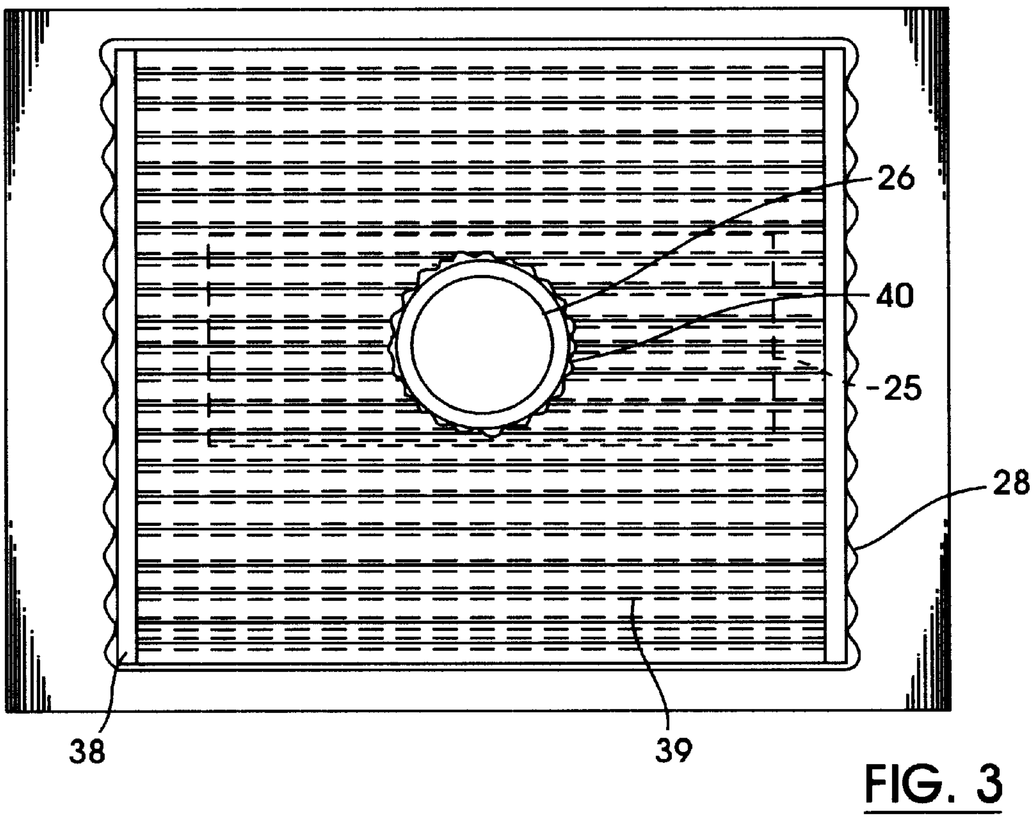
FIG. 3 is a perspective view of the inside face of the side of the waterproof box through which the waterproof sleeve extends.

An important factor in this method of making candles is the ability to control the rate of cooling of the liquid wax (67), and thus the form of the candle built up around the wick (19) or core candle (65), by varying the temperature of the wax reservoir (3), as shown in FIG. 2, and the temperature of the water (16). In the preferred embodiment of the apparatus to accomplish this method, rheostats are used for control for the heat element (35) in the wax reservoir (3) and for control for the waterproof box heat element (68).

There are various means to accomplish this method. However, the preferred embodiment of the apparatus to accomplish this method is disclosed in the drawings submitted herein. With specific reference to FIGS. 1 and 2, a perspective view of the over-all invention is shown. A wax reservoir (3), with a heated cradle (7), heated by an electric heat element (8) whose temperature is controlled by a rheostat control for the heat element (35) for which the electricity is supplied externally through a 220-volt rated electrical cord (34), is suspended above the open top (2) of a waterproof box (1) by means of a pivot arm (4) formed from one side of the wax reservoir (3) and extending a sufficient distance to a pivot arm attachment (5) on the wax reservoir support which is affixed to a side of the waterproof box (15), with the pivot arm (4) of the wax reservoir (3) being of sufficient length so that when attached to the wax reservoir support (6) at the pivot arm attachment (5), the outlet (9) and the opening in the bottom of the heated cradle (10) are directly above the center of the waterproof box (1), so that liquid wax (67) can flow, from the outlet (9) in the bottom of the wax reservoir (3) through the opening in the bottom of the heated cradle (10) and into the guide tube (12), having its own guide tube heat element (13) with a rheostat control for the guide tube heat element (36), when the shut-off valve (11) is opened mechanically, by being raised by depression of a foot pedal (29) located below the waterproof box (1), which when depressed raises the vertical support (30), as the direction of movement is reversed by the foot pedal pivot (69), which raises the horizontal support (31) and the top of the shut-off valve (33) which is removably affixed to the horizontal support (31) at the attachment point (32). In the preferred embodiment, the wax reservoir (3) and the shut-off valve (11) are made of copper.

As can be seen with reference to FIGS. 1, 3, 4, 5, the liquid wax (67) flows from the outlet end (14) of the guide tube (12) above the surface of the water (16) contained in the waterproof box (1) with an open top (2) and descends through the water (16), heated by waterproof box heat elements (68) whose temperature is set by a rheostat control for the water temperature (37), and collected on a base plate (17), around a wick (19) tied to a hole (22) in the wick support arm (21) rigidly positioned above the center of the base plate (17) by a vertical shaft (20) affixed to a side of the base plate (17), said wick (19) being stretched and tied through a hole (23) in the base plate (17). The base plate (17) is removably affixed to the top of the base plate holder (18), so as to remain attached as the base plate holder (18) while it is manually manipulated in the horizontal, vertical and rotational planes through a flexible waterproof sleeve (24) extending from an access hole (26), of sufficient diameter to accommodate the arm of the candle maker (artist), and communicating through a waterproof gasket (28), to which it is sealed against leakage at its flared inner neck (41) to the edge of a hole in the gasket (40), which waterproof gasket (28) spans nearly the entire inside of the side of the waterproof box, having the opening in the side of the waterproof box (27) and securely sealed at its edges by the gasket attachment frame (38) and having sufficient excess gasket material (39) so that the flexible waterproof sleeve (24) can move vertically and horizontally without compromising the water seal.

Figure 4:
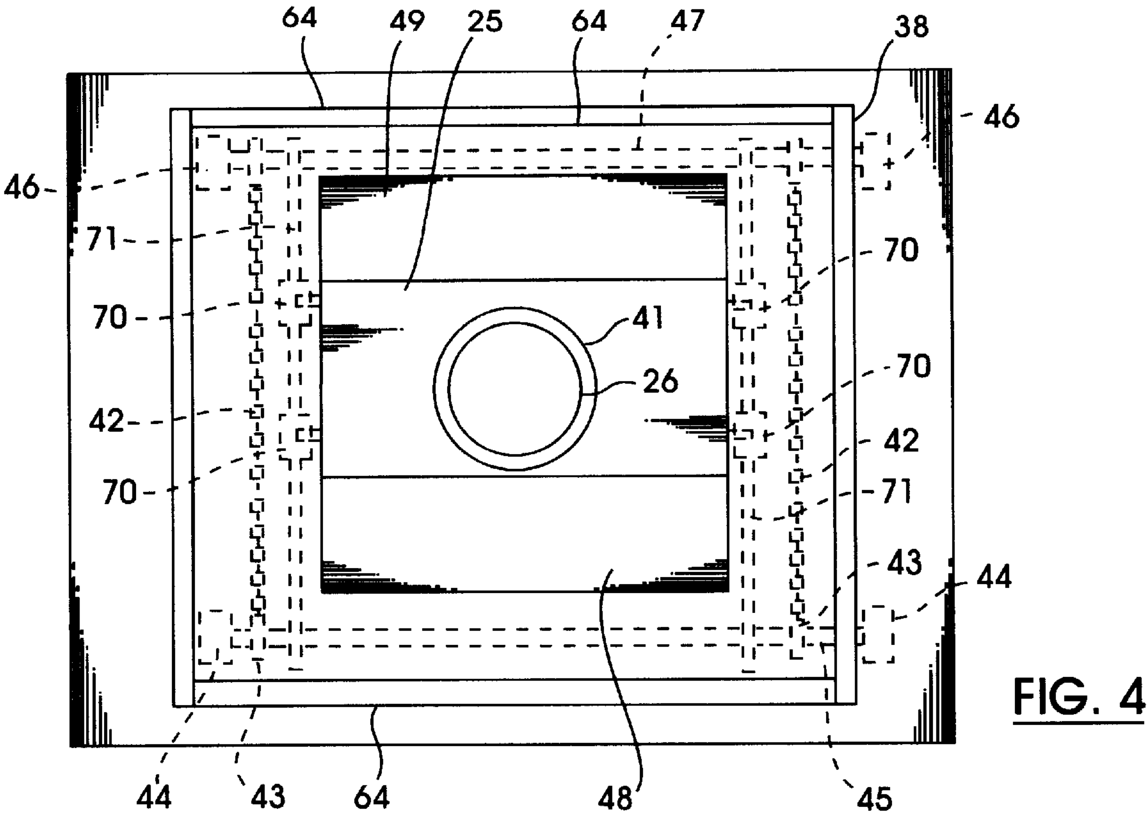
FIG. 4 is a sectional view of the detail of the inside face shown in FIG. 3 between the waterproof gasket and the side of the waterproof box.
Figure 5:
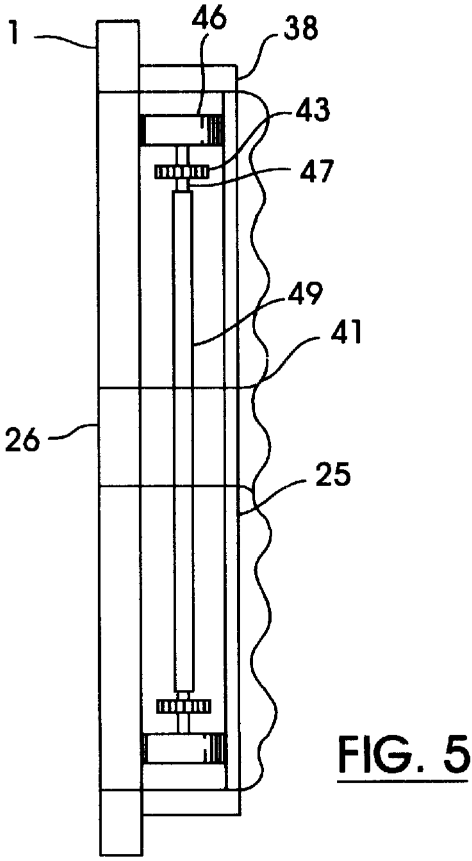
FIG. 5 is a cross-sectional view of the side of the waterproof box shown in FIG. 3.

With specific reference to FIGS. 4 and 5, the preferred embodiment of the invention relating to the vertical movement of the waterproof sleeve (24) is shown. The sleeve support plate (25) has grooved rollers (70) rotatably affixed to each corner whose grooves engage a vertical rail (71) on either side of the opening in the side of the waterproof box (27) on the inside of the waterproof box (1), and the sleeve support plate (25) is attached to a length of sleeve support plate bottom guide fabric (48) along its bottom edge and a length of sleeve support plate top guide fabric (49) along its top edge, which guide fabric is wrapped around a top shaft (47) which spans the top of the opening in the side of the waterproof box (27) and around a bottom shaft (45) which spans the bottom of the opening in the side of the waterproof box (27), the ends of which shafts are rotatably held in position by top roller bearings (46) and bottom roller bearings (44), and the sleeve support plate top guide fabric (49) and the sleeve support plate bottom guide fabric (48) being of sufficient length so as to allow vertical movement of the sleeve support plate (25) throughout the height of the opening in the side of the waterproof box (27) without becoming disengaged from the top shaft (47) or the bottom shaft (45), and the orientation of the sleeve support plate bottom guide fabric (48) to the sleeve support plate top guide fabric (49) being maintained by a continuous length of sprocket chain (42) stretched between and engaged with gears (43) at each end of the top shaft (47) and the bottom shaft (45). The movement of the sleeve support plate (25) being restrained in fixed relation to the side of the water proof box and being protected from damage by a retainer cover (64) of rigid material spanning the area within the gasket attachment frame (38) between the water proof gasket (28) and the roller bearings (44, 46). gears (43) and grooved rollers (70) and having an opening of sufficient dimension in its center to allow movement of the sleeve support plate (25) throughout its vertical travel on its rails (71) within the opening in the side of the water proof box (27).

FIGS. 6 and 7 demonstrate an alternate form of the preferred embodiment comprised of multiple wax reservoirs (3), in this version four, with individual heated cradles (7) contained in a multiple wax reservoir basket (50) with a pivot arm (4) affixed to the wax reservoir support (6) at the pivot arm attachment (5), each wax reservoir (3) having an outlet (9) co-located with an opening in the bottom of each heated cradle (10) on the bottom near the side closest to the center of the multiple wax reservoir basket (50), through which liquid wax (67) flows into individual wax supply tubes (51), having wax supply tube heat elements, which communicate into the alternate guide tube (52), aligned vertically along the length of the alternate guide tube (52) so that there is vertical separation between their connections to the alternate guide tube (52) so that the single opening (56) in the solid side of the alternate shut-off valve (53) can be positioned to allow the flow of liquid wax (67) from one individual wax supply tube (51) at a time into the hollow interior of the alternate shut off valve (53) and through its outlet end (57), while the solid side of the alternate shut-off valve (55) blocks the flow of liquid wax (67) from the other individual wax supply tubes (51). The position of the alternate shut-off valve (53) is controlled by its end being affixed to the horizontal support which communicates to the foot pedal (29) as shown in FIG. 1.

FIG. 8 discloses an alternative means of controlling the movement of the base plate (17) in the vertical, horizontal and rotational planes, being comprised of a remote control arm (58) extending from a base plate holder engagement plate (61) which spans the under surface of the base plate holder (18) and is rigidly attached to the end of the remote control arm extension (60) which arm extension spans the length of the waterproof sleeve (24) and is restrained in the horizontal plane by an inner stop (72), which stop is larger in dimension than the slot in the position plate (73), at a point along its length, so that the remote control arm extension (60) may not be withdrawn a distance which would damage the waterproof sleeve (24), and an outer stop (74) at a point along its length on the portion outside the position plate (59) to restrain the remote control arm extension (60) from being inserted beyond the limit of the excess gasket material (39) and the length of the waterproof sleeve, as the position plate (59) is larger than the access hole (26). The remote control arm is provided with a left hand grip (62) and a right hand grip (63).

FIG. 8 also demonstrates the alternative method of making the decorative candle (75) by utilizing a core candle (65) of narrow diameter and height equal to the desired height of the finished decorative candle. The core candle (65) is retained on the base plate by impaling it on a core candle pike (66) which protrudes through the hole (23) in the base plate (17).

FIG. 9 demonstrates an alternate means to control the base plate (17) being comprised of a support means which allows the base plate to be moved in three dimensions by a base plate control means, no part of which penetrates the sides of the water proof box (1). The support means is comprised of lengths of metal tubing, such as aluminum tubing, connected to each other by universal joints. The vertical support (76) is a length of metal tubing removably attached to one corner of the water proof box (1) by suitable means, such as clips (77), and extending above the sides of the water proof box (1) to communicate by universal joint (78) to a length of metal tubing (80) of sufficient length to span to the center of the waterproof box (1) and communicating by universal joint means (78) to a second length of metal tubing (81) of sufficient length to reach through the open top (2) of the water proof box (1) to its bottom and communicating by universal joint (78) to the base plate support arm (83), also made of the same metal tubing and rigidly affixed to the base plate (17) by suitable means. The base plate control means is composed of a handle (86) of suitable design to be easily grasped by one hand of an artist, to which is rigidly attached by suitable means (82) a control arm (85) of metal tubing of sufficient length to reach from the outside of the waterproof box (1) to above its open top (2) and to which is rigidly attached by suitable means (82) a span arm (84) of metal tubing of sufficient length to reach the expanses of the open top (2), to which is rigidly attached by suitable means (82) a vertical arm (87) of metal tubing of sufficient length to reach and rigidly communicate by suitable means (82), with the base plate support arm (83), all so that movement of the handle (86) by the artist results in direct movement of the base plate (17).

Further, the movement of any mode of the control means for directing the movement of the base plate (17) can be directly or by computer linked to the control means for a plurality of Water Candle Boxes to mass produce the decorative candles (75) and the movement of the control means can be determined by a computer program, so as to replicate predetermined decorative candle (75) designs.

Accordingly, it is understood that within the scope of the claims appended hereto, the invention may be practiced otherwise than as specifically disclosed herein.

I claim:

1. An apparatus for making candles being comprised of:

a means of holding liquid wax suspended above a volume of water held in a waterproof box, having a bottom and sides with an open top;

a means for selectively allowing the liquid wax to move to and be released into the water;

a means to collect the liquid wax as it falls through the water and build it up around a wick to form a decorative candle; and a means to control the rate of cooling of the liquid wax comprised of a rheostat control means to adjust the temperature of electrical heating elements in the sides of the waterproof box, in the means of holding liquid wax, and in the means of moving the liquid wax to the water, the electrical power being externally supplied through a 220-volt rated electrical cord means.

2. An apparatus according to claim 1 wherein the means of holding liquid suspended above a volume of water comprises:

a wax reservoir, having a bottom and sides, contained in a heated cradle means, having a bottom and sides, and having a pivot arm extending from one side of sufficient length to removably engage a pivot arm attachment means on a wax reservoir support which extends upward from, and is attached to, a side of the waterproof box, so that the wax reservoir is positioned above the center of the waterproof box;

a cradle heated by an electrical heat element whose temperature is varied by a rheostat control for the electrical heat element, the electricity being supplied externally through a 220-volt rated electrical cord means; and an outlet in the bottom of the wax reservoir located so as to communicate with an opening in the bottom of the heated cradle, both of sufficient diameter to allow liquid wax to flow therethrough.

3. An apparatus according to claim 1 wherein the means for selectively allowing the liquid wax to move from the wax reservoir to be released into the water, being comprised of:

a guide tube communicating from the outlet in the bottom of the wax reservoir through the opening in the bottom of the heated cradle of sufficient hollow inner diameter to allow the flow of liquid wax and having its own guide tube heat element with a rheostat control for the guide tube heat element located with the rheostat control for the electrical heat element for the heated cradle and having the same electrical supply, and extending to near the surface of the water and having an open outlet end through which the liquid wax is released to fall into the water; and a shut-off valve having one end flaring to a diameter greater than that of the outlet in the bottom of the wax reservoir so as to stop the flow of liquid wax when it is lowered into the outlet and its other end extending to above the wax reservoir to removably attach to a horizontal support which extends to above a side of the waterproof box and is attached to a vertical support which communicates to a foot pedal pivot and thus to a foot pedal which extends horizontally below and beyond the side of the waterproof box, so that when the foot pedal is depressed the shut-off valve is raised opening the outlet and allowing the flow of liquid wax into the guide tube.

4. An apparatus according to claim 2 wherein the wax reservoir is made of copper.

5. An apparatus according to claim 3 wherein the shut-off valve is made of copper.

6. An apparatus according to claim 1, wherein the means to collect the liquid wax as it falls through the water and build it up around a wick to form a decorative candle is comprised of:

a base plate having a wick tied through a hole in its center and stretched to be tied to a hole in one end of a wick support arm, rigidly positioned above the center of the base plate by a vertical shaft affixed to a side of the base plate to which the end of the wick support arm, opposite to the one to which the wick is tied, is connected at the end of said vertical shaft opposite to the end affixed to the side of the base plate;

a base plate holder to which the base plate is removably attached so that it remains attached as the base plate holder is manually manipulated in the horizontal, vertical and rotational planes through a flexible waterproof sleeve extending from an access means in a side of the waterproof box which is of sufficient diameter to accommodate an arm and hand of a candle maker/artist;

an access means being comprised of:

a large square opening in a side of the waterproof box covered on the inside by a waterproof gasket sealed against leakage at its edges by a gasket attachment frame, said gasket having a hole at its center of sufficient diameter to accommodate a rigid flared inner neck of the waterproof sleeve around which the gasket is sealed, which gasket material has sufficient excess height and width beyond the dimensions of the gasket attachment frame so that the waterproof sleeve can move in the vertical, horizontal and rotational planes without compromising the waterproof gasket water seal;

a sleeve support plate, to which the end of the waterproof gasket opposite to the base plate holder is attached, having a hole in its center of identical dimension as the inside of the flexible waterproof sleeve, and having grooved rollers rotatably affixed to each corner parallel to the length of the sleeve support plate, which grooves engage a vertical rail on either side of the opening in the side of the waterproof box on the inside of the waterproof box, while the sleeve support plate is attached to a length of sleeve support plate bottom guide fabric along its bottom edge and a length of sleeve support plate top guide fabric along its top edge, which respective guide fabrics are wrapped around a top shaft at the top of the opening in the side of the waterproof box and around a bottom shaft at the bottom of the opening in the side of the waterproof box, the ends of said shafts being rotatably held in position by a top and bottom roller bearing means, and the sleeve support plate top guide fabric and the sleeve support plate bottom guide fabric being of sufficient length so as to allow vertical movement of the sleeve support plate throughout the height of the opening in the side of the waterproof box without either fabric becoming disengaged from the top shaft or the bottom shaft, while the orientation of the sleeve support plate bottom fabric to the sleeve support plate top guide fabric is maintained by a continuous length of sprocket chain stretched between and engaged with gears at one end of the top shaft and bottom shaft and another continuous length of sprocket chain stretched between and engaged with gears at the other end of the top shaft and bottom shaft, the movement of the sleeve support plate being restrained in fixed relation to the side of the waterproof box and being protected from damage by a retainer cover of rigid material spanning the area within the gasket attachment frame between the waterproof gasket and the roller bearings, gears, and grooved rollers and having an opening of sufficient dimension in its center to allow movement of the sleeve support plate throughout its vertical travel on its rails.

7. An apparatus according to claim 6 wherein the liquid wax is built up around a core candle of narrow diameter and of a height equal to a desired height of a decorative candle and being retained on the base plate by its bottom being impaled on a core candle pike which protrudes through the hole in the base plate.

8. An apparatus according to claim 1 wherein the means for holding liquid wax suspended above a volume of water held in a waterproof box with an open top and a means for selectively allowing the liquid wax to move to and be released into the water comprised of multiple wax reservoirs with individual heated cradles contained in a multiple wax reservoir basket having a pivot arm extending from one side of sufficient length to removably engage a pivot arm attachment means on a wax reservoir support which extends upward from, and is attached to, a side of the waterproof box, so that the center of the multiple wax reservoir basket is positioned above the center of the waterproof box, each wax reservoir having an outlet, co-located with an opening in the bottom of each heated cradle, on the bottom near the side closest to the center of the multiple wax reservoir basket, through which liquid wax flows into individual wax supply tubes, having wax supply tube heat elements, which communicate into an alternate guide tube, each individual wax supply tube aligned vertically along the length of the alternate guide tube so that there is vertical separation between their connections to the alternate guide tube so that a single opening, in a solid side of an alternate shut-off valve with a hollow interior, can be positioned to allow the flow of liquid wax from only one individual wax supply tube at a time into the hollow interior of the alternate shut-off valve and through an outlet in its bottom end, while the solid side of the alternate shut-off valve blocks the flow of the liquid wax from the other individual wax supply tubes, the position of the alternate shut-off valve being controlled by vertical movement of a horizontal support, to one end of which the top of the alternate shut-off valve is removably attached and the other end being attached to a vertical support which communicates to a foot pedal pivot and thus to a foot pedal which extends horizontally below and to beyond the side of the waterproof box, so that as the foot pedal is depressed the single opening in the solid side of the alternate shut-off valve moves from one individual wax supply tube to another allowing the flow of liquid was into the hollow interior of the alternate shut-off valve and through its outlet to the water below, or to a point along the inner face of the alternate guide tube thus stopping the flow of liquid wax into the hollow interior of the alternate shut-off valve.

9. An apparatus according to claim 6, wherein the means to collect the liquid wax as it falls through the water and builds up around a wick to form a candle includes a remote control arm, which extends from a base plate holder engagement plate which spans the under surface of the base plate holder and is rigidly attached thereto at the end of a remote control arm extension which spans the length of the waterproof sleeve and is restrained in the horizontal plane by an inner stop, located at a point along its length, which stop is larger in dimension than a slot in a position plate, of dimension larger than the access hole and located outside of the access hole, through which the remote control arm protrudes, so that the remote control arm extension may not be withdrawn a distance which would damage the waterproof sleeve, and an outer stop, located at a point along the length of the remote control arm extension on the portion outside the position plate to restrain the remote control arm extension from being inserted beyond the limit of the excess gasket material and the length of the flexible waterproof sleeve, and the end of the remote control arm extending outside the access hole and beyond the position plate has a left hand grip and a right hand grip flaring from its remote control arm extension.

10. An apparatus according to claim 1 wherein the means to collect the liquid wax as it falls through the water and build it up around a wick to form a decorative candle is comprised of a base plate having a wick tied through a hole in its center and stretched to be tied to a hole in one end of a wick support arm, rigidly positioned above the center of the base plate by a vertical shaft affixed to a side of the base plate to which the end of the wick support arm, opposite to the one to which the wick is tied, is connected at the end of said vertical shaft opposite to the end affixed to the side of the base plate;

a base plate support means which allows the base plate to be moved throughout three dimensions by a control means, no part of which penetrates the sides of the water proof box, being comprised of lengths of metal tubing connected to each other by universal joint means with one end being a vertical support removably attached to one corner of the water proof box by a suitable means and being of sufficient length to extend above the sides of the water proof box and communicating by universal joint means to a length of metal tubing of sufficient length to span to the center of the water proof box and communicating by universal joint means to a second length of metal tubing of sufficient length to reach through the open top of the water proof box to its bottom and further communicating by universal joint means to a base plate support arm, comprised of a length of metal tubing, and rigidly attached by suitable means to the base plate;

a base plate control means being comprised of a handle, of suitable design and manufacture to be easily grasped by one hand of an artist, to which is rigidly attached, by suitable means, a control arm, of metal tubing of sufficient length to reach from outside of the water proof box to above its open top and to which is rigidly attached, by suitable means, a span arm of metal tubing of sufficient length to reach the expanses of the open top, to which is rigidly attached by suitable means a vertical arm of metal tubing of sufficient length to reach and rigidly communicate, by suitable attachment means, with the base plate support arm, all so that movement of the handle by the artist results in a direct movement of the base plate.

11. A combination of apparatus according to claim 1 wherein the means, to collect the liquid wax as it falls through the water and build it up around a wick to form a decorative candle, has a control means so that a plurality of apparatus are connected through their control means by suitable mechanical or electronic means, so that more than one decorative candle may be made at a time.

* * * * *